US006625619B1

(12) United States Patent
McClendon et al.

(10) Patent No.: US 6,625,619 B1
(45) Date of Patent: Sep. 23, 2003

(54) ELECTRONIC TAXONOMY FOR CONSTRUCTION PRODUCT INFORMATION

(75) Inventors: Susan McClendon, Atlanta, GA (US); John R. Witherspoon, Roswell, GA (US); Robert Paul Dean, Atlanta, GA (US)

(73) Assignee: Building Systems Design, Inc., Atlanta, GA (US)

( * ) Notice: Subject to any disclaimer, the term of this patent is extended or adjusted under 35 U.S.C. 154(b) by 151 days.

(21) Appl. No.: 09/809,466

(22) Filed: Mar. 15, 2001

Related U.S. Application Data
(60) Provisional application No. 60/190,225, filed on Mar. 15, 2000.

(51) Int. Cl.[7] .............................................. G06F 17/30
(52) U.S. Cl. ....................................... 707/104.1; 707/3
(58) Field of Search ............................. 707/3, 5, 104.1, 707/2, 6, 10, 101, 103 R, 102; 705/26, 20; 717/107, 108; 345/629

(56) References Cited

U.S. PATENT DOCUMENTS

| | | | |
|---|---|---|---|
| 5,197,001 A | 3/1993 | Mukherjee | 705/29 |
| 5,260,866 A | 11/1993 | Lisinski et al. | 705/29 |
| 5,341,469 A | 8/1994 | Rossberg et al. | 715/514 |
| 5,479,343 A | 12/1995 | Matoba et al. | 700/106 |
| 5,515,269 A | 5/1996 | Willis et al. | 705/29 |
| 5,526,520 A | 6/1996 | Krause | 707/104.1 |
| 5,541,394 A | 7/1996 | Kouchi et al. | 235/375 |
| 5,570,291 A | 10/1996 | Dudle et al. | 700/45 |
| 5,625,827 A | 4/1997 | Krause et al. | 715/502 |
| 6,006,203 A | 12/1999 | Ushiki | 705/29 |
| 6,119,102 A | 9/2000 | Rush et al. | 705/29 |
| 6,128,626 A * | 10/2000 | Beauchesne | 707/104.1 |
| 6,236,409 B1 * | 5/2001 | Hartman | 345/629 |
| 6,499,026 B1 * | 12/2002 | Rivette et al. | 707/2 |
| 6,529,898 B1 * | 3/2003 | Fortner et al. | 707/3 |
| 2002/0007361 A1 * | 1/2002 | Esaki et al. | 707/4 |

OTHER PUBLICATIONS

Gottschlich, S.; Ramos, C.; Lyons, D.; discloses assembly and task planning: a taxonomy in IEEE Robotics & Automation Magazine, vol.: 1 issue: 3, Sep. 1994; pp.: 4–12.*
Shi, Y.; Gregory, M.J.; discloses international manufacturing configurations and transforming strategies; Engineering Management Conference, 1995, 'Global Engineering Management: Emerging Trends in the Asia Pacific'., Proceedings of 1995 IEEE Annual Intern.*

* cited by examiner

Primary Examiner—Diane D. Mizrahi
(74) Attorney, Agent, or Firm—Jones Day

(57) ABSTRACT

The present invention provides systems and methods for identifying and organizing assembly project item information in such a way that item data sets can be readily defined and recorded, quickly searched and compared, and accurately transmitted among software applications and translated into the form needed without the need for human intervention or interpretation. A typical environment will include a common taxonomy to provide standardize communication. The taxonomy uses a common set of terms including element names representing items and item categories and criteria associated with given elements. A common data structure is used to store criteria across disparate elements. The taxonomy is typically organized hierarchically, and many embodiments use a hierarchical criteria interface to view, select and insert element information. One such embodiment encompasses a virtual product library wherein disparate item information developers can index relevant item information according to the taxonomy and submit the generated indexes to the virtual product library for searching and procuring by relevant user communities. In another embodiment, disparate assembly project related applications can be used to select and specify items related to a given assembly project. A centralized link manager according to the present invention can support centralized organization of item information related to the project. Some such embodiments may support identification of mismatched item information selected or specified via the disparate assembly project related applications.

51 Claims, 3 Drawing Sheets

ELECTRONIC TAXONOMY FOR CONSTRUCTION PRODUCT INFORMATION

CROSS-REFERENCE TO RELATED PATENT APPLICATION

This application claims the benefit, pursuant to 35 U.S.C. §119(e), of applicant's provisional U.S. patent application Ser. No. 60/190,225, filed Mar. 15, 2000, entitled "AN ELECTRONIC TAXONOMY FOR CONSTRUCTION PRODUCT INFORMATION", which is, by this reference, hereby incorporated herein for all purposes.

BACKGROUND OF INVENTION

1. Field of Invention

The present invention relates to systems and methods for managing and sharing information related to assembly projects. More particularly, the invention relates to electronic systems and methods for facilitating selecting, specifying and procuring items related to assembly projects using an electronic taxonomy for organizing, communicating and sharing information between potentially disparate software applications.

2. Description of Related Art

Of all the types of data exchanged between parties involved in construction, product information constitutes the largest volume. Construction is made of physical things and all of the preliminaries like drawings, estimates, and specifications, are only required because we need to incorporate physical things into an actual built project. Unfortunately, attempts to standardize the organization and presentation of product information have mostly failed because there are so many manufacturers and they are reluctant to allow third-party organizations to control their data. In addition, there is an intimidation factor involved; namely, the hundreds of thousands of products on the market generate a definite perception in the industry that organizing product information is too overwhelming a project.

The principal processes that use product information are product selecting, specifying, and procuring. For a particular product, the product selecting and specifying processes are commonly repeated successively, starting during the design process, by people with different roles, until the actual point of procurement.

1. Selecting Products: The process by which a person chooses the product appropriate for a particular application, resulting in a match of requirements to properties; an iterative process, in which requirements are commonly modified based on available properties.
2. Specifying Products: The process of documenting requirements. The result is usually referred to as a specification, not to be confused with manufacturers' "specifications" that describe the actual properties of their products.
3. Procuring Products: The process of acquiring real, physical products required for construction, repair, or replacement.

Selecting, specifying, and procuring products are processes integral to all phases of design, documentation, construction, and operation of projects. Most existing software applications designed specifically for the construction industry were developed because of the need to manipulate product information in some way. Because product information is so important, any method of information exchange that does not address it will ultimately fail because there is little use in the ability to exchange information about a project if one cannot actually exchange the information needed to select, specify, and buy the products necessary to build it.

A problem is that many players in the industry use different terminology to describe the same products and properties, even those who are actually speaking the same language. As long as product information communication employs "user-defined" terms, there will be insufficient standardization to communicate with precision, and without precision computer communication is useless. Even when computers are not used, the use of different terminology reduces the accuracy and efficiency of the communication significantly.

So far, none of the standardization or integration efforts have dealt with products and their properties in detail. The most prevalent taxonomy in the U.S. construction industry, MASTERFORMAT, covers product names only; it is widely used for arranging product catalogs, specifications, and cost estimates because it is relatively simple to use. The second most commonly used taxonomy, UNIFORMAT, covers built elements only and is a hierarchical classification mostly used for arranging cost estimates and early stage building descriptions. Some European systems improve on these classification efforts by establishing separate classifications for different types of things, including facilities, built elements, products, materials, and properties. The CI/Sfb (U.K.) and its successor UNICLASS were designed to be human-readable but are more like an electronic taxonomy and, as a result, have been little used because they are so complex. Further, the IAI Project Model (Ifc's) does not represent products in any significant detail, although much work has been done on modeling built elements, particularly from the design and drawing point of view. However, there are no known software applications that facilitate communication of product property information using existing taxonomies.

SUMMARY OF THE INVENTION

The present invention provides systems and methods for identifying and organizing construction product information in such a way that product data sets can be readily defined and recorded, quickly searched and compared, and accurately transmitted among software applications and translated into the form needed without the need for human intervention or interpretation. These systems and methods involve a taxonomy specifically designed for computer rather than human use, with software applications providing a human-readable interface and output documents.

A typical environment will include a common taxonomy to provide standardized communication. The taxonomy uses a common set of terms including element names representing items and item categories and criteria associated with given elements. A common data structure is used to store elements across disparate criteria; this common data structure will include a portion of the structure to store information related to specific criteria associated with a given element. In many embodiments, this portion preferably includes the following fields: criteria name, criteria value, units of measure and method of observation. The taxonomy is typically organized hierarchically. In one embodiment, a particular taxonomy may be used within a construction project for communicating information related to construction elements such as built-elements, built-element categories, products product categories, spaces within constructed facilities, constructed facilities and the relevant criteria associated with any of these elements.

In certain embodiments, the taxonomy is maintained by a centralized authority, which may provide updates to users of the taxonomy on a periodic or on demand basis. The taxonomy may be initially created based by the authority using industry standards accepted in the given assembly industry. In other embodiments, the taxonomy may be further developed through the provision to item manufacturers or brokers or other developers of information related to items in the given assembly industry of an indexing program with a current taxonomy and allowing the development and submission extension of the taxonomy by individual indexers of item information.

Figure 1:
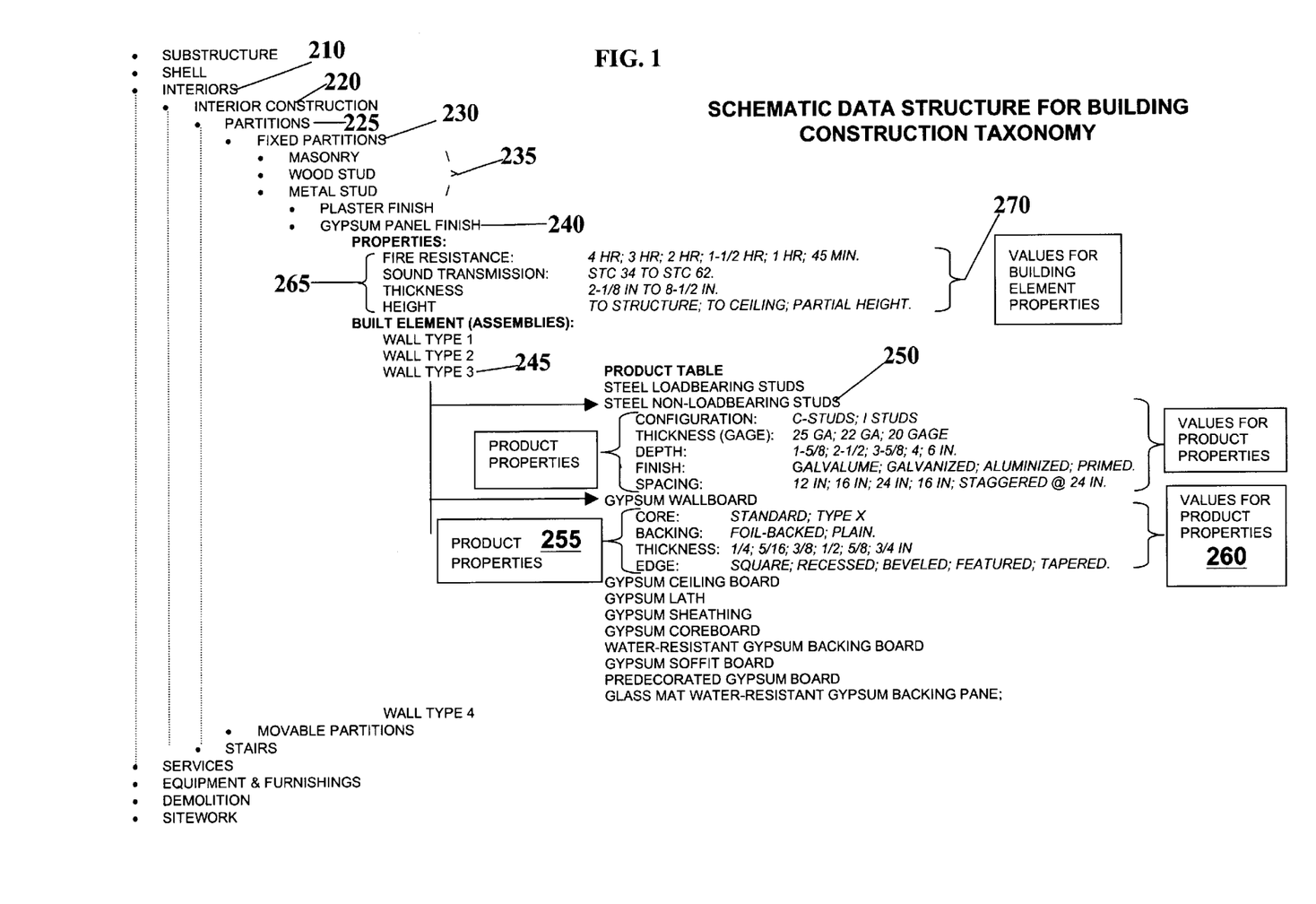
FIG. 1 is a sample portion of the populated taxonomy according to the present invention.

Many embodiments use a hierarchical criteria interface to view, select and insert element information. Such an interface might, in one embodiment, appear in a manner similar to the example hierarchy seen in FIG. 1. In such an interface, the various elements (e.g. 210, 220, 225, 230, 235, 240, 245, 250) and criteria representing properties (e.g. 255, 265) would be selectable. Selection of an element would cause the display of the elements names that are below the selected element in the hierarchy and criteria associated with the selected element. For example, assuming FIG. 1 represented a sample hierarchical criteria interface, selection of "Gypsum Panel Finish" 240 triggers display of criteria/values 265, 270 and elements "Wall Type 1", "Wall Type 2", "Wall Type 3" and "Wall Type 4". Selection of a criterion would allow the designation of a particular value associated with the selected criteria; the designation could be by any appropriate input mechanism such as a text entry area for direct entry of a value or a menu of selectable values.

One embodiment of the present invention encompasses a virtual product library wherein item information from disparate item manufacturers or brokers or other developers of information related to items in the given assembly industry can be integrated into a common environment that may facilitate selection, specification and procurement of items related to a specific assembly project. An indexing program can be distributed to relevant sources of item information that allow the particular source to submit their respective item information in a manner compliant with the taxonomy. This indexing program, in certain embodiments, is the same indexing program discussed above with respect to the development of the taxonomy. The distributed indexing program can index relevant item information according to the taxonomy and submit the generated indexes to the virtual product library environment for searching and procuring by relevant user communities. The indexes from the various sources can be integrated into a single common index spanning items described across the disparate item information sources. Upon receipt of a query that typically includes an element name and a set of desired criteria, the virtual library environment can search the common index for items meeting the specified query. The results of this search can be presented to the originator of the query. The results can be formatted in a variety of manners depending upon the intended mode of presentation to the originator of the query. In preferred embodiments, the above-described hierarchical interface may be used for generating the initial query, presenting the results of the search or both.

In another embodiment, disparate assembly project related applications can be used to select and specify items related to a given assembly project. Typically, each such application will maintain a distinct data store of project related data in an application specific format. A centralized link manager according to the present invention can support centralized organization of item information related to the project. Typically, such a link manager may read item information created by the disparate applications either directly from such applications or indirectly from an application specific data store associated with each such application. The link manager organizes such received or retrieved item information according to the taxonomy. The link manager may in certain embodiments create a project data store for storing the item information in a centralized, taxonomy compliant manner. In preferred embodiments, the link manager compares the item information organized according to the taxonomy from the disparate application to identify matching and mismatching item information. The matching and mismatching item information is then displayed to the end user. In one embodiment, the presentation is via the hierarchical display discussed above. The end user may be afforded an opportunity to resolve mismatching information and provide additional data regarding matching or mismatching items after the information is displayed; in such embodiments, the resolving or additional data may be used to update various data stores associated with the project including a centralized project data store and/or various application specific data stores.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION OF THE INVENTION

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. In the foregoing discussion, the following terms will have the following definitions unless the context clearly dictates otherwise.

Built Elements: The parts of the completed construction described by their function rather than what they are made out of; also referred to as "assemblies," "objects" (Ifc), and sometimes "systems."

Products: Materials and equipment to be incorporated into or constituting a built element.

Product Information: Information about the properties of products.

Property: An actual property of a real product.

Requirement: A statement of a required property of a product to be used for a particular purpose. Requirements are usually stated as minimums or maximums, whereas properties are usually stated as actual, exact, or approximate values.

Assembly Project: A project involving assembly of the final result from multiple parts or components.

Item: Any of the parts or components going into an assembly project.

Element: An item or category of items.

Item Criterion: A property or requirement for an item.

Item Set: An item name and a set of item criteria corresponding to the named item.

Taxonomy Compliant Data Store: A taxonomy compliant data store refers to a data store associated with a project that can store item information concerning the project organized according to a taxonomy according to the present invention. Such data stores will typically include a common project data store and/or data stores maintained by individual project related computer applications.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The two basic pieces of the taxonomy comprising the present invention are:

1. A simple, open-ended standard data structure that accommodates virtually any product information that needs to be transmitted.
2. A set of terms with specific meanings for the names of the principal types of information that need to be conveyed: built elements, products, and product properties.

The taxonomy depends on the use of both pieces. A standard data structure without standardized content results in efficiently transmitted data that must be interpreted by the receiving human. To date, no software application is known in the construction industry that uses data with specific meanings to facilitate information exchange, although many use internal data structures that have inherent meaning.

In the preferred embodiment of the invention, the taxonomy is adopted by significant members of the industry, a possibility that is preferably encouraged by the following exemplary guidelines:

1. The set of standard terms is not contaminated by imprecise additions by users; both a controlling organization and an official synonym list must be provided.
2. Each data developer is in actual control of its own data (imperative for manufacturers).

In the preferred embodiment of the present invention, software tools would enable quick and accurate definition of data sets (Indexer), enable communication between the existing independent applications that use product information (LinkMan), and use the taxonomy for searching and selecting products (Virtual Products Library, or VPL). Information utilizing the taxonomy may be communicated via a variety of communication channels including computer networks such as the Internet.

The Internet is a global network of connected computer networks. Over the last several years, the Internet has grown in significant measure. A large number of computers on the Internet provide information in various forms. Anyone with a computer connected to the Internet can potentially tap into this vast pool of information.

The most wide spread method of providing information over the Internet is via the World Wide Web (the Web). The Web consists of a subset of the computers connected to the Internet; the computers in this subset run Hypertext Transfer Protocol (HTTP) servers (Web servers). The information available via the Internet also encompasses information available via other types of information servers such as GOPHER and FTP.

Information on the Internet can be accessed through the use of a Uniform Resource Locator (URL). A URL uniquely specifies the location of a particular piece of information on the Internet. A URL will typically be composed of several components. The first component typically designates the protocol by which the address piece of information is accessed (e.g., HTTP, GOPHER, etc.). This first component is separated from the remainder of the URL by a colon (':'). The remainder of the URL will depend upon the protocol component. Typically, the remainder designates a computer on the Internet by name, or by IP number, as well as a more specific designation of the location of the resource on the designated computer. For instance, a typical URL for an HTTP resource might be:

http://www.server.com/dir1/dir2/resource.htm where http is the protocol, www.server.com is the designated computer and /dir1/dir2/resouce.htm designates the location of the resource on the designated computer.

Web servers host information in the form of Web pages; collectively the server and the information hosted are referred to as a Web site. A significant number of Web pages are encoded using the Hypertext Markup Language (HTML) although other encodings using the eXtensible Markup Language (XML) or the Standard Generic Markup Language (SGML) are becoming increasingly more common. The published specifications for these languages are incorporated by reference herein. Web pages in these formatting languages may include links to other Web pages on the same Web site or another. As will be known to those skilled in the art, Web pages may be generated dynamically by a server by integrating a variety of elements into a formatted page prior to transmission to a Web client. Web servers and information servers of other types await requests for the information that they receive from Internet clients.

Client software has evolved that allows users of computers connected to the Internet to access this information. Advanced clients such as Netscape's Navigator and Microsoft's Internet Explorer allow users to access software provided via a variety of information servers in a unified client environment. Typically, such client software is referred to as browser software.

In an exemplary embodiment of the present invention, the basic transmission format of the information is XML because it is a machine-readable standard. XML formatted product information identified and organized in accordance with the taxonomy may be transmitted by many different means, including as email attachments, embedded in HTML web pages, in formats native to the communicating applications, as well as in basic XML.

BUILT ELEMENT NAMES:

When instructions are given for construction, the name of the constructed element is used to identify the location and function of the construction. Although there is less ambiguity in built element names than in product names, some does exist, usually as regional variations. For example, a "lift" means something different in the U.K. than it does in the U.S. and a "wall" has a slightly different meaning than a "partition" although there is no "official" definition of either. Standardized names of built elements with a logical organization are preferred for the user-interface to the taxonomy. In an embodiment of the present invention, a user who is uncertain about the name of a product will traverse a hierarchical "tree" of built elements to find the names of products and properties.

Although tree structures are very familiar in Windows-based software applications, the preferable structure is distinct in that it "freezes" the tree to allow the user to become familiar with the location of particular built elements and products. A UNIFORMAT-style organization is preferably used because it is already somewhat familiar and it is fundamentally logical. UNIFORMAT itself, however, is not internally consistent enough to use without modification.

In an exemplary embodiment of the present invention, CSI/DBIA's PerSpective product, which has resulted in a more precise set of built element names than ever before, iserves as a starting point for the tree structure. Preferably, the PerSpective standard is extended to cover all types of construction projects without prejudice—UNIFORMAT and PerSpective both have a bias towards buildings that will alienate non-building construction proponents. While the set of built element names should be as comprehensive as possible, the present invention allows for future extensions.

There is a point where built elements intersect with products. To some extent, that point is at the dividing line between MASTERFORMAT and UNIFORMAT, but that line is imprecise. A simple set of rules must exist to govern whether a name belongs in the list of product names or the list of built element names, or both. In an embodiment of the invention, the following parameters may be used:

Products typically are things that can be bought; discrete physical objects that are commonly available from established makers; usually have model/brand names or part numbers, though not always.

Built elements are the in-place manifestation of individual products or assemblies of products.

Sometimes a built element is a single purchased product, set in place. (For example, a pre-engineered metal building is a single purchased product, an assembly, and a built element all at once.)

A built element may have the same name as a product, while nevertheless comprising an assembly. For example, "toilet" is a good term for a built element and is also a single purchasable product. When assembled into a built element, the product "toilet" is combined with inlet and outlet piping, shutoff valve, and pipe seals (each of which is a product in its own right) to form the built element "toilet."

The same name can be used as a built element name for both field-assembled assemblies and pre-assembled products of the same type, despite the fact that they may be classified completely differently in MASTERFORMAT. A field- or shop-assembled cabinet is treated in MASTERFORMAT as a completely different product than a factory-built cabinet—even though they perform the same function and would be part of a built element called "cabinet." In this case, the question is not what is the built element name, but whether the "product" is the cabinet or the different products of which the cabinet is made.

PRODUCT NAMES:

The generic name for a product is usually a highly specialized form of jargon that often has specific technical connotations as well as general meanings. Sometimes the name is chosen by its manufacturer based more on how the manufacturer desires to promote the product than on what the product actually is. Different participants in the process use names of different degrees of precision for the same product and a lot of archaic jargon is still in use. For instance, the term "flush wood door" describes a wood door manufactured in a specific way, distinguishing it from a "stile-and-rail wood door," but a "paneled door" could be either type.

Most resistance to "classification" by manufacturers relates to product names, because of the common perception that the name somehow prescribes the uses for which the product is suitable. Manufacturers hope that by giving the product a particular name, their liability is limited when the product is misused. Other participants simply don't try or don't need to be precise in their use of names. For example, design professionals are taught to use the least specific name possible on the drawings, to avoid the necessity for changing the drawings when the required product is changed later in the design process.

Unfortunately, the generic name is usually a key piece of data in searching for available products. At present, the generic name is the only useful piece of data that an Internet search engine can use to find products, although even with a good generic product name the search results are often not very useful. Although agreeing on product names is likely to be one of the most difficult and controversial issues in this whole process, it is a necessary step. In time, it should be possible to find relevant products by searching for a set of property values without stating a product name (see Virtual Product Library "VPL", described in greater detail herein). Until that time, though, the name assigned by the manufacturer will continue to be very important.

Whether in a relational database or in XML files, there is no technological need to define products by name—each set of properties is defined as a set by its relationship to a product instance. In relational database jargon, this is referred to as a one-to-many relationship—one product record, many property records. In aecXML, for example, a tag is present that defines the start of a product's property list, with a corresponding tag to end the list. The generic name may simply be one of the properties of the product, just as the brand name is, or it can be a stored in a dedicated field as a predefined attribute of the product itself. In either case, the generic names used will be picked from a specific list of names. In one embodiment of the invention, this taxonomy is incorporated into the IAI Project Model or aecXML, and the list of names is an external "domain" or "library" referenced by them.

In the preferred embodiment of the present invention, the set of product names used in the taxonomy would be derived as follows:

Start with MASTERFORMAT; use as many other existing references as possible; do not attempt to start from scratch.

Eliminate alternative names, but rather than discarding non-preferred names, establish an official synonym list that can be used by software applications.

Use the following principles when new names must be devised:
1. Long names are undesirable. It is not necessary to convey all properties of the product in its name;
2. Limit names to a required base part and a single optional modifier;
3. The base part of the name should be a word or two that define either its form or function. Forms: Board, sheet, tile, wire, etc. Functions: Stud, skylight, window, fan, etc. There are a relatively limited number of these; there would be a standard list;

4. Principal modifiers would be materials (plywood panel, steel sheet, aluminum skylight, polyethylene pipe). There are relatively few modifiers; and
5. Secondary modifiers that are useful involve combining form with function (centrifugal fan, sloped aluminum curtainwall).

PROPERTY DESCRIPTIONS:

The largest portion of the standardized data set consists of information about product properties and requirements. A comprehensive or definitive "classification" or other standard representation of all products is often envisioned as the only solution but is both unachievable and unnecessary. The marketplace will always be out ahead of the standard no matter what resources are applied—new products with new combinations of properties are being developed every day. Any standard must therefore be open-ended, flexible enough to be modifiable without extensive study and without invalidating the earlier standard. That means that any structure that involves fixed, predefined fields is doomed to failure. To illustrate:

Take a small data set consisting of several products having the same four properties: Width, quality standard, color, and flame spread index. The conventional way to structure data for products having these properties is to create four named fields (in Ifc jargon "Ifcs" or "classes"; in aecXML jargon "tags"): Width, QualityStandard, Color, and FlameSpreadIndex. Each different generic product would have its own unique set of fields, possibly hundreds each. Although there would surely be ways to reduce duplication, there would ultimately be thousands of fields, each for a different property. In a relational database, such an organization would be completely unworkable unless it was completely static.

For example, in the IAI Model, adding fields for more properties involves domain volunteers, modelers (programmers), testing, and publishing. Extending the aecXML schema would also require agreement on new tags and technical work. If thousands of new Ifcs or tags were proposed, neither organization would be able to cope with the initial development, much less the later volatility. As a demonstration of that, both provide for the exchange of additional data (user-defined "property sets" and "private data") that is standardized only between the two parties that agree to exchange it.

In contrast to the conventional data structure, the present invention calls for organizing the property data into a common data structure that applies to all properties. For instance, each property has a name and a value. In an exemplary embodiment, 2 fields are defined: PropertyName and Value. In a database, the data records would be rows in a table:

TABLE 1

| PropertyName | Value |
| --- | --- |
| Width | 36 inches |
| Quality standard | FS CCC-W-408D, Type III |
| Color | Light blue |
| Flame spread index | 25 |

In aecXML, the two fields would be represented by two tags: <PropertyName> and <Value>. The data would actually be the values of the tags rather than the tag names. (In the Ifc model, similar classes already exist for defining properties generically like this, although the structure is considerably more complex.)

In both a database table and aecXML, the technique of this invention is efficient. There is no need to change the data structure to accommodate new types of properties. The only necessity is to agree on the meaning of the property names—not an insignificant project but a different kind of effort. There is not too much difference between the conventional and new data structures as to the number of data items that must be agreed upon. The main difference is that in the conventional scheme 100 percent of the standardization must be part of the model or schema (making it inherently more complicated to maintain), while in the new scheme 99 percent of the standardization is contained in a small number of simple data lists that can be maintained separately from the model/schema. The latter is an advantage that can make the difference between success and failure.

The key to defining an open-ended data structure for product information is to identify the types of information necessary to fully define every kind of property and requirement that is likely to be needed. Based on available data (product data in catalogs, construction specifications, cost estimates, etc.), the preferred embodiment has the following set of fields:

PropertyName

Value (numeric portion, in numerals or text)

Units (of measure; includes "unitless", "each" and 1)

Method (means of determining the value; e.g. ASTM E84, "observation", "measurement")

MinMax (whether the value is a minimum, maximum, exact, or approximate value)

For example, if a small data set described light blue vinyl wall covering, its properties or requirements would be stated as in Table 2 (below)—the only difference between a property and a requirement would be the value of the field MinMax:

TABLE 2

| PropertyName: Width | PropertyName: Quality |
| --- | --- |
| Value: 36 | Value: Type III |
| Units: inches | Units: none |
| Method: measurement | Method: FS CCC-W-408D |
| MinMax: min | MinMax: min |
| PropertyName: Color | PropertyName: Flame spread index |
| Value: Light blue | Value: 25 |
| Units: none | Units: none |
| Method: observation | Method: ASTM E84 |
| MinMax: approx | MinMax: max |

Presumably any requirement or property can be completely defined with data in these fields, but in the preferred embodiment, the structure would be tested on a wide variety of product types. A test on flush wood doors, a relatively complex combination of raw material, finishes, and manufactured product, for the IAI PM Domain revealed about 35 properties considered important by the manufacturer, specifiers, and estimators. Other important properties not usually found in this type of data include those necessary to actually buy the product—stock/part numbers and the like.

Products preferably included in the test are:

raw materials like sand, cement, etc.

basic materials like plywood, gypsum board, nails, etc.

coatings like paint, waterproofing, etc.

"products" comprised of field-assembled components (built-up roofing)

products that are available both factory-made and shop- or field-assembled (cabinets, air handling units)

operating equipment (fan, dishwasher)

In addition to the physical properties and corresponding requirements, this data structure is applicable to properties and requirements of built elements, including design criteria that are never apparent at the product level. For instance, the sound transmission classification (STC) of a partition can be described using this data structure, even though the property "Sound Transmission Classification" does not apply to any single product that makes up the element.

PROPERTY NAMES:

During the process of testing the data structure, a considerable amount of data will be collected. Property names, sample values/units, and methods will be identified. Every effort should be made to capture this information as a base set of data. Some types of properties will be very obvious and will apply to a wide variety of products; others will apply only to specific products. In addition, properties seem to fall into a small number of basic categories:

1. Dimensions and Configuration: Sizes, shapes, arrangements, locations, etc. Length, width, diameter, shape, flatness, etc.
2. Composition and Construction: What the product is made out of and how it is assembled. Mostly specific to product types. Material, finish, accessories, etc.
3. Performance: Properties related to what the product does rather than what it is made from. Fire resistance, sound generated, life span, etc.
4. Market-Related: Manufacturer, brand name/part number, cost, availability, warranty, etc.

In the preferred embodiment of the present invention, whenever a property is used it will be called by the same name, regardless of the product. Therefore, it is preferable that the development of the standard set of terms should focus first on the commonly used and interchangeable properties. It would also be preferable to capture any definitions that will help users identify the appropriate property name (e.g. how to decide between calling a dimension width or thickness).

In a preferred embodiment of the present invention, dimensional/configuration and market-related properties would be standardized first, because they are essential to procurement operations and would enable a certain amount of information exchange even if the remainder of the properties were not yet standardized. If outside help is needed, organizations with an interest in e-commerce would be the obvious sources.

Preferably, the second group to standardize would be performance properties because many apply to many different products. Much work on identifying performance properties has already been done, particularly during the PerSpective development effort.

Composition and construction will be the hardest to standardize. Besides the sheer volume of different properties, manufacturers typically want to differentiate their products from others, not to show how they are the same. On the other hand, wherever there is a voluntary quality standard developed by a trade association, there has usually been agreement on important properties of the relevant products.

THE ELECTRONIC TAXONOMY FOR CONSTRUCTION PRODUCT INFORMATION:

In an exemplary embodiment of the present invention, the completed taxonomy comprises:

1. A data structure that will accommodate any built element or product and any property of either.
2. A comprehensive set of built element names, a policy on new built element names, and a hierarchical organization for them.
3. A base set of generic product names, and a policy on new generic names.
4. A list of product name synonyms.
5. A base set of product property names, with corresponding methods and units, and definitions where available.
6. A list of property synonyms.

FIG. 1 portrays an example of a portion of such a taxonomy. The hierarchy has several layers. One such top-level layer INTERIORS 210 is exploded into a view of multiple potential sublevels 220, 225, 230, 235. The sublevels contain categories of built elements (e.g. "Gypsum Panel Finish" 240), built elements (e.g. "Wall Type 3" 245) and products (e.g. "Steel Non-loadbearing Studs" 250). Properties 255 and associated values 260 may be associated with categories of products. A different set of properties 265 and associated values 270 may be associated with categories of built elements and built elements.

Figure 2:
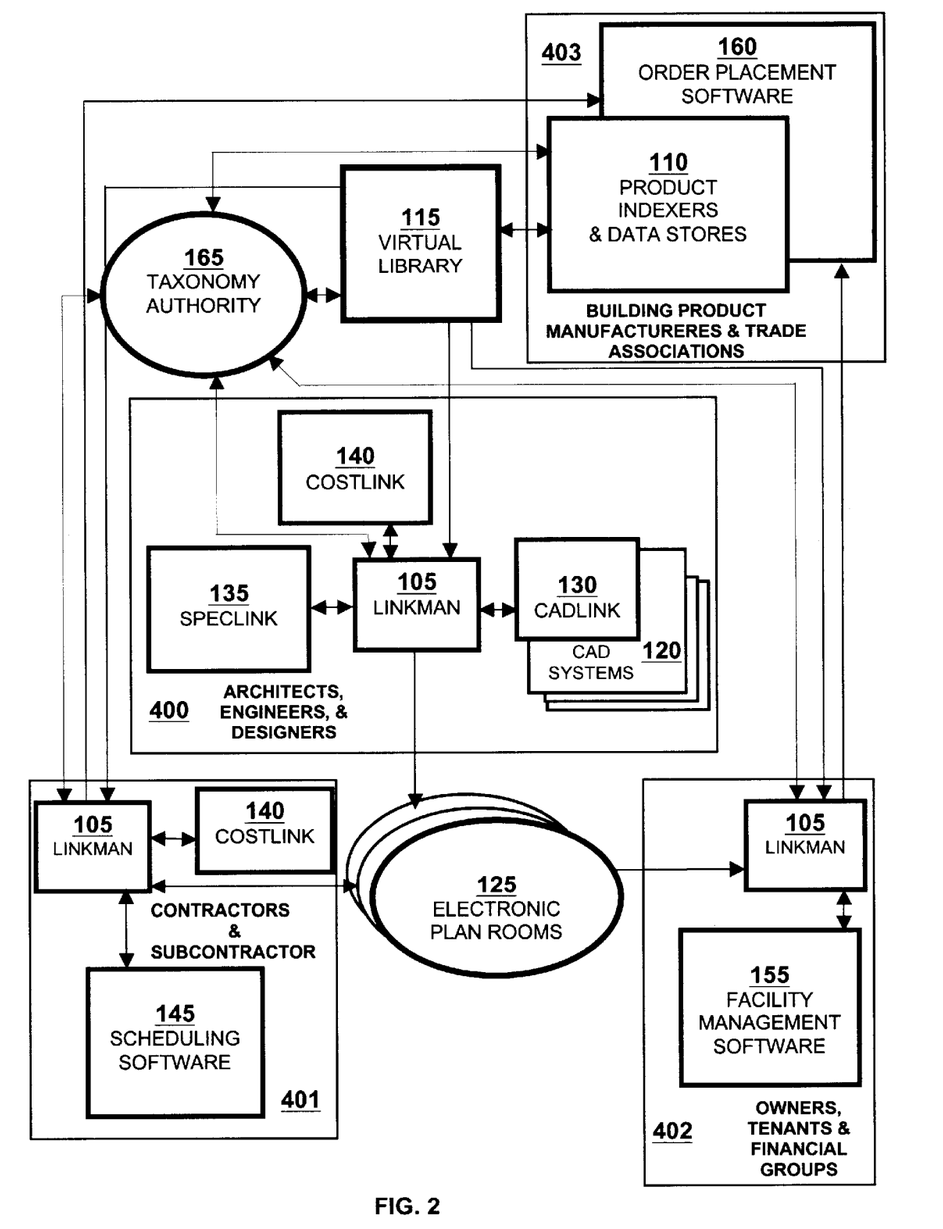
FIG. 2 is a block diagram of software components, end users, and data developers in one embodiment.

SOFTWARE APPLICATIONS:

The taxonomy enables software applications to communicate in ways people really want. The software tools preferred for implementation are described below; some of these components are depicted in FIG. 2.

An Indexer to embed hidden property information into application files, companion files, and HTML files so that independent organizations can maintain compliant data without interfering with their existing functions, with XML export function; can operate on/in CAD, SpecLink, CostLink, stand-alone cost databases, electronic plan rooms, web pages, etc. The indexer is essential to construction of any linked software applications. It will also discourage development of non-compliant linking data jargon and non-preferred terms) by providing definitions, a synonym list used in a manner transparent to the user, and a "submit" feature that enables the user to send proposed extensions to a secretariat for consideration.

An aecXML Property Reader to enhance Internet browsers so they can view and retrieve hidden information for product information search and procurement data retrieval. This is likely to be a giveaway promotional tool, like ACROBAT READER by Adobe, Inc. One simple way to promote the use of the taxonomy as a standard is to make the Indexer insert an icon into the web page file with a link that will open the companion (or embedded) XML indexed property data file, using a "reader" that would display it in an easy to read format, which could be printed or saved to file. The reader would be free for the download and the icon would become known as the way to obtain taxonomy-compliant, easily comparable data from manufacturers—the web equivalent of CSI's Spec-Data. Design professionals would ask for compliant data and manufacturers would only have to buy the Indexer to do that. Embedded promotion would explain how LinkMan could capture the data for use in a complete project model.

A LinkManager to build and maintain project databases of product information to facilitate interchange of information between independent software applications, namely CAD, specs, cost, scheduling, procurement, with reporting function and XML output. LinkManager/LinkMan, described infra, is provided in an exemplary embodiment to facilitate this interchange.

Estimating [CostLink/CM], specification [SpecLink], scheduling, and other packages with information interchange enabled.

An Internet-based criteria-based product search tool based on central indexing of independent-server-based data files, with ability to automatically receive independently indexed data and to capture non-compliant data for evaluation. Virtual Product Library (VPL), described infra, is provided in one embodiment as an aspect of the invention as a search tool.

VIRTUAL PRODUCT LIBRARY

In an exemplary embodiment of the present invention, a Virtual Product Library (VPL) is provided to enable product searching.

Existing Internet construction product information models are deficient in the following ways:

1. They rely on charging product manufacturers for "storage space." The manufacturers really don't want or need that, and most manufacturers know it. More manufacturers every day figure out how to best present their products on their own web sites. Why should they pay someone else to display a duplicate of that data on another web site? If the only reason is to generate traffic, then the traffic-generator has to be really valid.

2. The "traffic-generators" currently available are very poor. Some are direct in their approach, claiming better access to product information. Others use different types of lures to get designers and specifiers to the site and then offer them the product information too. Some models appear to think that the lure is enough, disregarding the fact that the lure may be the only thing the designer or specifier is really interested in. Product information is not a fun or sexy subject—most specifiers don't browse product information unless they have (a lot of) time on their hands. Designers certainly do not, unless they cannot immediately find the product they have imagined.

3. Even the direct product information traffic-generators are poor. They are based on MASTERFORMAT 5-digit number searches at best, more commonly on keyword searches, and at worst on manufacturer name searches.

Some prior art models rely on the searcher to know the name of the manufacturer they are looking for. Because "caveat emptor" applies in construction design, specifying, and procurement, just as in any other business, that method provides little benefit. A designer, specifier, or buyer normally wants to verify that more than one manufacturer makes this product, either to satisfy himself or herself that the claims of the manufacturer are reasonable or to be sure he can get competitive pricing. One cannot do that if one doesn't know who else makes a similar product. Manufacturers probably drive these models, since they really don't want to be compared to others. However, intelligent manufacturers know that they need to compete intelligently, because designers, specifiers, and buyers hate to be tricked into buying a product just as much as consumers do.

Keyword searches are inherently faulty, because they rely on indexing all the words in the hosted document, including such statements as "so-and-so is not XXXX" where XXXX is the word that the searcher is looking for. The poor searcher is doomed to find all sorts of products that don't meet his requirements, soon loses all interest in sorting out the good data from the bad, and probably won't come back again.

MASTERFORMAT 5-digit number searches are better, because the products have been classified at least rudimentarily—the "not XXXX" condition is ruled out. However, MASTERFORMAT 5-digit numbers only get the searcher into the general ballpark and are useless unless they are consistently implemented. Some information providers do the indexing themselves to keep the consistency high; others let the manufacturer choose his own category regardless of whether it is accurate. Some (many?) actually choose to index themselves under competing product categories instead of their own, which makes such a search about as valuable as a keyword search.

4. The scope of the data is insufficient. Even if a good traffic-generator is available, it is still necessary to have a wide range of data available. If the searcher can't find what he wants at the site there is no point in being able to search intelligently. The models that rely on selling storage space are inherently faulty in this respect, since their data is limited to those manufacturers who will pay, unless the storage fees are so low that a lot get on the bandwagon. The models that provide their traffic-generator as a by-product of other services and include links to other data as well (e.g. ARCAT) are more successful in this respect.

SELECTING PRODUCTS:

In an exemplary embodiment, products are identified through the present invention as follows: A designer/specifier wants to find out whether there is any product available that can fulfill the design's functional and aesthetic requirements. He/she has heard that there is a web site that has criteria-based product searching (a classified index) to hundreds of thousands of real products. He/she doesn't really believe it but is willing to give it a try.

1. At the web site, the designer/specifier is shown a hierarchical index interface that shows all the generic products available with all their possible properties. They are presented in an easily understandable arrangement that assists in finding the appropriate properties. The interface is not a blank or even a pull-down keyword input box, although that option is available. It is also possible to search by properties without assuming any specific product.

2. The designer/specifier selects the properties of interest and selects from the values offered—he can specify either a single value or a range that would be acceptable. The index finds all the matching products and displays them in an easily browsed list, with their full property lists available plus a link to whatever additional data the manufacturer has available on his own web site.

3. The index will never be unable to find a matching product but it won't do that by limiting the index options to those products indexed. If there is actually no match, the index will look for other values or "back up the tree" until it finds the next best match or matches. When the user makes changes to the property/value selections, the index will search again based on the new criteria.

4. When the desired product is found, a property sheet can be printed or pasted into a local document. If LinkMan is running, the property set can be automatically pasted into the project database for use by CAD, specifications applications, cost estimating applications, etc.

SPECIFYING:

If competitive bids or pricing must be obtained, which is usually the case, some sort of specification must be prepared. This can range from listing the names of the products that the project has been designed around to a full-blown descriptive product specification complete with alternative manufacturers or products, administrative requirements, and installation instructions. Whether this is done for all products to be used on the project or not depends mostly on the consequences if the constructor uses the wrong product and how much risk there is of that happening.

In an exemplary embodiment of the present invention, the specifier discovers whether other identical or similar products are available, what kinds of variations there are, who makes them, and whether they have characteristics that might make them unacceptable for this project. The latter information is needed so the specification can be adjusted to preclude substitution of these unacceptable products, usually by adding other criteria that they cannot meet. A specifier may need to do all this for a single product, a group of products, or every product on the project.

In another exemplary embodiment of the present invention, the specifier obtains the manufacturer's recommended installation instructions as follows:

1. At the web site, the specifier uses the same interface as during the product selection phase. He/she selects the applicable product and enters either the product that is the "basis of design" or only the most important property/value criteria. (If LinkMan is running and the specifier has a copy of the project database, the original property set from the product selection phase can be automatically submitted, rather than re-entering the data.)
2. A list of all matching products is presented, in a comparison interface, where properties are shown side-by-side for easy review. The specifier can mark properties as "essential" and select ranges of values that are required; the index will rule out any products not meeting the further criteria.
3. Once a set of acceptable products is identified, the specifier can mark each of them for retrieval—with either full product data or brand name identification only—a property sheet can be printed or pasted into a local document. If LinkMan is running, the property set can be automatically pasted into the project database.

The specifier then prepares the contract/bidding/procurement documents using his own application, which may or may not be linked to LinkMan.

PROCURING PRODUCTS:

A buyer of construction products often receives a requirements specification listing a "basis of design" product or a generic product/property description, with or without manufacturer names or brand names. There may be restrictions on substitution of other products. He/she needs to identify the most economical product available that will meet the requirements, within the restrictions on substitutions. (If the buyer does not have a specification to match, then he/she is actually functioning in the designer/specifier mode as well as in the buyer mode.)

The buyer also typically needs to obtain delivery, handling, storage, and installation instructions, shop drawing and other submittal data to forward to the designer, and operation and maintenance data to forward to the owner. An exemplary embodiment of the present invention for procuring products includes the following:

1. At the web site, the buyer uses the same interface as during the product selection and specification phases. He/she selects the applicable product and enters either the name of product that is the "basis of design" or the specified property/value criteria. (If LinkMan is running and the buyer has received or has access to a copy of the project database, the original property set from the product selection/specifying phase can be automatically submitted, rather than re-entering the data.)
2. A list of all matching products is presented, in a comparison interface, where properties are shown side-by-side for easy review, with procurement sources. The buyer can review all properties in the same way the specifier can.
3. Once a set of acceptable products is identified, the buyer can mark each of them for pasting into a procurement document or a request for a price quote. If LinkMan is running, quantities and schedule can be automatically obtained from the project database and the proposed products recorded without overwriting the original criteria.
4. If a designer is involved, the buyer requests transmission of shop drawing and other submittal data to obtain approval of the selected product by pasting the data into a message document or other automated method. Many submittal documents will be electronic documents but some must be physical (i.e. samples, color selections, etc.).
5. Once the product has been purchased, the buyer requests transmission of operation and maintenance data to the owner by pasting the data into a message document or other automated method.

E-commerce will need to accommodate the request for quote, request for submittal data, purchase order, payment, delivery and shipping information, and request for operation and maintenance data.

All electronic submittal documents should contain the product property set in XML form transparently attached in the electronic document as well as in visible human-readable form.

KEY ASPECTS:

Key aspects of an exemplary embodiment of Virtual Product Library are as follows:

1. Searches are based on properties and values indexed using a standard data set, leading prospective specifiers and buyers more directly to the information they need.

This criteria-based search method is more effective than the current search methods and will lead to repeat traffic. For example, currently it is possible to search by keyword for "hypalon waterproofing" or by MASTERFORMAT for 07140 and get a lot of matches, but they are very general matches that each have to be evaluated. In a criteria-based search, it will be possible to search for the criteria "waterproofing membrane", "made of hypalon", "white in color", "mechanically attached", "resistant to wind uplift equivalent to I-90", and "available in the State of Alaska" all in one search. Although it is theoretically possible to do that with a keyword search, the likelihood of finding anything at all is extremely low because a keyword search looks for exact word matches. If you eliminate the phrases so that more words match, you get so much junk that the search is worthless.

2. The indexing of the data is done by the manufacturer, using a provided indexer that uses the standard data set.

Accuracy of the indexing is up to the manufacturer. To promote accurate indexing, a single product can be indexed with only one set of physical attributes. If a manufacturer wishes to index a product more than one way, he pays for each as if it was a different product. All the properties any manufacturer will want to index will be included; if more are required, the manufacturer can add them and index his product using them. The indexer tool will facilitate submission of proposed changes/additions to the standard data set.

3. Manufacturers control their data physically as well as conceptually.

The actual descriptive or promotional information, whether in HTML files, or other format, is stored wherever the manufacturer wishes. The service is only an index—the traffic-generator, the "Yellow Pages", the "Thomas Register", etc., and the manufacturer controls exactly what goes into it. Links lead from the index entries to the physical location where more information can be found.

4. Manufacturers are not limited to the structured data that is necessary for searchability and product comparison.

The unique features of their products or the unique presentation that they feel they must make to effectively sell their products are still available. They get the best of both worlds—searchable data and promotional presentation.

5. No search is a null search.

The object-oriented classification system allows not only "next closest match" for property values, but also allows matching similar product categories and assemblies. The initial data is complete enough to offer real results.

ADVANTAGES:

Embodiments of the present invention offer the following advantages:

Designers (architects, engineers, interior designers, specifiers) can base new designs on the properties of products or ranges of products actually currently available on the market, reducing the likelihood of design errors and taking advantage of the vast amount of information provided by product manufacturers without being overwhelmed by the sheer volume of data.

Specifiers can base construction/bid/procurement documents on the properties of products or ranges of products actually currently available on the market, reducing the need to re-evaluate the design or specification when specified products are not available, reducing the cost of administration of the contract, and reducing the constructor's procurement costs.

Buyers (constructors, owners) can more quickly identify many examples of real products that meet their requirements and compare prices, availability, and intangible properties.

Buyers can more easily obtain and transmit to designers and owners the actual product data, installation requirements, and operation and maintenance data provided by the product manufacturer.

Sellers (product manufacturers) can choose how to present their products, in both standardized and unique ways, and can control the presentation completely.

Buyers and sellers can connect directly via e-commerce.

Owners can receive detailed data about the actual products installed, for future use in operation, maintenance, repair and replacement, as a by-product of the procurement process rather than through a separate and expensive data-gathering process.

TECHNICAL:

A software tool [Indexer] is preferable to allow product manufacturers to build their own product indexes. The tool presents the same index interface as to users, making it clear to manufacturers how the users will view their data. The tool preferably builds a database of products, properties and values based on the manufacturer's selection of properties for each of the products he wants to index. Each individual product has its own set of properties—a product is defined as the smallest unit that has a unique part number. Part-number products can be assembled into larger part-number products.

Preferably, each individual product property set can be pasted into an existing HTML product data sheet using XML coding or be saved in XML format in a companion file with a file name that associates it with the original HTML file.

The tool will also read back these files, showing the property set they represent [VPL Reader].

In an exemplary embodiment, the tool has utilities for signing up for the service, submitting the index, updating the index, logging on to see current listings, marking products for deletion from the index (a form of update), viewing current account data, etc.

On the web server side, the system preferably receives indexes and sends acknowledgments, merges new indexes into the master index, manages manufacturer sign-up and accounts, and offer the indexing tool via e-commerce. Ideally, no bills will be sent, although reminders via email will be useful. The manufacturer will log on, view the status of his indexes and his bill, and pay via e-commerce.

A query tool made available by the web server will manage on-line search requests. It will also transmit property sets to the user's local copy of LinkMan, if active, for storage in its project data file.

Also preferable will be off-line search preparation software, downloaded from the site, with search submission utilities. (Mostly for large searches, such as validation of a whole LinkMan project database.)

INITIAL DATABASE GENERATION

Despite the fact that the search software preferably prevents null searches, a certain critical mass of data will be necessary at launch. Manufacturers will not come to the site unless they see that there is traffic, especially since there are currently a large number of sites that offer no real value to manufacturers. On the other hand, there is no possibility of providing a complete index on day one, even if the resources were available.

To create an initial database free indexing is preferably provided, at least for a preliminary time period. The critical mass required is unknown, but several statistics are provided below to help form an estimate:

R.S. Means Building Construction Cost Data (BCCD) includes about 2,000 generic products that are actually product groups or classes. Since these are clearly the products that Means believes people want to know the cost of, they would presumably also be the products that people want to verify the actual availability of, specify, and buy.

MASTERFORMAT includes about 1200 medium-scope headings in Divisions 2–16. If there were 5 narrow-scope product headings in each, there would be about 6000 generic products. This is a theoretical number, less reliable than the Means Cost Data number, because MASTERFORMAT is inconsistent as to what level an individual product, rather than a group, occurs.

A set of the most commonly used product groups therefore probably lies somewhere within the range outlined above—say about 4,000.

In an embodiment of the invention, one actual product for each of these groups is indexed, making sure that the properties listed in the Means Cost Data and in SpecLink specifications data have been included. If any manufacturer was indexed only once, 4,000 manufacturers would be included. Combining this indexing process with the testing of the data structure and development of the base property set (see following description) yields a considerable portion of the base property set at the same time.

This method would not capture one example for each product variation. It might be desirable to add more product indexes for the most commonly used products.

MAINTAINING THE DATABASE:

Preferably, the manufacturers indexed are given a certain time period to decide whether to sign on, after which their index would be removed. All they would have to do would be consent, reducing their learning curve. The initially indexed product on-line would be a vivid demonstration, making it easy for manufacturers to imagine the effect of indexing the remainder of their products. An automated sales effort may be utilized to generate a certain number of sign-ups. The subsequent sales effort would target competitive manufacturers of the same products, using the original indexed products as incentives.

In a preferred embodiment, when a corresponding paying customer signed up, a non-paying initial indexee may be dropped. If no one signs on in a particular category, other manufacturers' products may be indexed, continuing to build up the base property set at the same time. Based on approximately 13,000 manufacturers total [data from The Architect's Catalog (www.ARCAT.com) and First Source for Products (www.afsonl.com)], the initial 4,000 would be about 30 percent, leaving plenty to substitute.

The cost of maintaining an individual product indexed on the site is preferably set low enough that manufacturers have no reason to object, resulting in virtually complete market penetration. This would make the index the most complete as well as the easiest to use.

LINKMANAGER/LINKMAN

A preferred embodiment of the current invention includes a software application, entitled Link Manager, or LinkMan, that manages the communication of built element, product, and property data between software applications. This application reads properly indexed data from any compliant application and copies it into a project database. It can export indexed data that can be read by any compliant application. It presents several views of the project data to the user, who can modify, delete, and add to the data. The views also highlight discrepancies between data in the different applications, for resolution by the user.

The Link Manager does its job by having a complete copy of the taxonomy as its base data. When properly indexed data is read, the Link Manager matches the data up to the taxonomy and constructs an equivalent hierarchically-organized project database populated by the built elements, products, and properties identified.

Each application usually deals with a certain subset of the entire project data. For instance, a specification application deals with products and properties but seldom associates them directly to built elements. On the other hand, a CAD application identifies and describes built elements and often does not "know" anything about the products they are made of. The Link Manager builds up the project database from all the sources of data, matching built elements to the taxonomy and applying the products to the built element hierarchy as best it can. Another view of the project shows all the products regardless of how they are associated with the built element hierarchy.

Only built elements, products and properties that are already in either the taxonomy or the project database are recognized. Data that is not properly indexed would be noted, for resolution by the user. The user can add user-defined built elements, products, or properties to the project database, so that subsequent reading of the other application's data will match up. The tool to add user-defined objects is very similar if not identical to the Indexer. The user is shown a hierarchical index interface that shows all the built elements, products and properties in the taxonomy. A keyword search is also available. The user selects from the taxonomy the name for the built element or product he wishes to define. He can also give it an alias, or select a name from the synonym list, if he doesn't like the taxonomy term.

(In the preferred embodiment, the taxonomy includes names for all the built elements and products likely to be needed. Variations are accomplished by assignment of different property sets.) He then selects from all the properties in the taxonomy for that built element or product. If the property he wants is not available, he can define a new property. Then he selects from the values offered for the property or inputs his own value.

When reading data from other applications, the Link Manager records which applications have supplied each piece of data, so that discrepancies can be highlighted. For example, the CAD drawing may have certain lines on the plan indexed as a partition—this information would result in creation in the Link Manager project of the built element "partitions" (which is actually a group) and its parents in the hierarchy. If the drawing also identified the partition as a certain type—say a gypsum board partition using metal studs—that partition type would be added to the partition group. If the CAD user has used the Indexer properly, the partition index data will include the names of the products the partition is made out of and at least some of the product properties. Now suppose that the specification application's index data is read. If no index data on gypsum board is found in the specification data, there is a discrepancy between what the CAD drawing shows and what the specification shows. The discrepancy may or may not be an error—since drawings and specifications are usually treated as complementary documents, there is never a one-to-one correspondence between them. The user will always have to resolve discrepancies himself, because the Link Manager cannot discern which application is correct.

When it is necessary to convey data between two applications, each application receives data from the Link Manager, rather than from the other application. There are at least five possible ways the data from applications is exchanged:

1. The Link Manager reads data files exported by the other applications. Each application's data must be properly indexed. All comparisons are made using the Link Manager views.
2. The Link Manager can export XML data that the other applications read and use however they see fit.
3. Other applications may be able to read the Link Manager's database directly and use the data however they see fit.
4. Link Manager could read another application's index data directly if it is totally compliant with the taxonomy and if the index data is kept up to date continuously, rather than built at the time of export.
5. Link Manager can be configured to know how another application understands and uses data and can then act on behalf of that application to communicate in compliance with the taxonomy.

The following are applications that will benefit from exchange of data via the Link Manager [105] as seen graphically in FIG. 2:

Computer Aided Drawings (CAD): CAD software [120] is used to construct electronic drawings represent built elements. Some properties of built elements, and some products and their properties are also included in the CAD drawings. Communication of built element and product information to and from drawings via the Link Manager (LinkMan) may in some embodiments be via a CADLink component [130] similar to the Indexer.

Cost Estimating: Cost estimating software [140] is used to construct estimates of the costs of products and built elements; some products, properties, built elements may potentially be communicated to and from the cost estimate via the Link Manager.

Specifications: Specifications management software [135] is used to prepare specifications for products and some built elements. Product and built element information may potentially be communicated to and from specifications via the Link Manager.

Scheduling: Scheduling software [145] is used to prepare time schedules for actual construction and needs information about built elements and some product and property information, which may potentially be communicated via the Link Manager.

Product Information Published by Product Manufacturers: A Virtual Product Library [115] could provide a common index to product information published by multiple manufacturers which is currently located on thousands of web sites. Product indexers and local data stores [110] could communicate index data to the Virtual Library. Product and property information may potentially be communicated to drawings, specifications, and cost estimates via the Link Manager.

Internet Browsers: An end user with aecXML Property Reader installed in conjunction with a browser may potentially communicate information about products and properties found on web pages via the Link Manager.

Plan Rooms: Plan rooms are physical places where design professionals exhibit construction documents for new projects, to enable contractors and suppliers to estimate costs and prepare bids. Electronic plan rooms [125] would be able to communicate the same information described for CAD and specifications above via the Link Manager.

Facility Management: Facility management software [155] stores and manages information about the constructed project, including built elements, products, and their properties, which potentially may be communicated to the facility management database via the Link Manager.

E-commerce: Internet-based procurement is accomplished using order placement software [160], which must describe products and their properties. Product information from drawings and specifications may potentially be communicated via the Link Manager.

A typical environment according to the present invention includes multiple, separate end user environments, as depicted in FIG. 2, which, communicate via any suitable communication channel, which in a typical embodiment will be a computer network such as the Internet. In other environments, communication between end users may be via other form of computer network, direct dial-up connection, dedicated connection, or other suitable channel as would be known to those skilled in the art. In some embodiments the communications channel may provide security features; for instance, a secure socket layer (SSL) may be used with respect to an embodiment using the Internet as the communication channel. In one embodiment, the end user may be supported via Intel-compatible hardware platforms preferably using at least a PENTIUM III class microprocessor (Intel Corp., Santa Clara, Calif.). The hardware platform would have an appropriate operating system such as WINDOWS 2000 (Microsoft, Redmond, Wash.), WINDOWS/NT (Microsoft, Redmond, Wash.), or LINUX (or other UNIX variant). Depending upon the hardware/operating system platform, appropriate software may be included to support the desired applications, email and Web browser functionality.

In a typical embodiment, each end user computer will include a copy of the Link Manager [105] and one or more of the independent applications the Link Manager can communicate with. For instance, architects, engineers, and designers [400] would typically have a CAD application [120], such as Autocad (Autodesk, San Rafael, Calif.) or MicroStation (Bentley, Exton, Pa.); a specification application [135], such as BSD SpecLink (Building Systems Design, Inc., Atlanta, Ga.), PerSpective (CSI/DBIA, Alexandria, Va.), or other database-oriented text management system with a master database; and in some instances also a cost estimating application [140], such as BSD CostLink (Building Systems Design, Inc., Atlanta, Ga.), Timberline Precision Estimating (Timberline Software Corp., Beaverton, Oreg.), or SuccessEstimator (U.S. Cost, Inc., Atlanta, Ga.). Contractors and subcontractors [401] would typically have a cost estimating application [140], such as BSD CostLink (Building Systems Design, Inc., Atlanta, Ga.), Timberline Precision Estimating (Timberline Software Corp., Beaverton, Oreg.), or SuccessEstimator (U.S. Cost, Inc., Atlanta, Ga.) and a scheduling application [145], such as Primavera Project Planner (Primavera Systems, Inc, Bala Cynwyd, Pa.) or Microsoft Project (Microsoft, Redmond, Wash.). Owners, tenants, and financial groups [402] would be likely to have a facility management application [155], such as Facility Property Manager (Facility Information Systems, Inc, Camarillo, Calif.), or Archibus/FM (Archibus Inc., Boston, Mass.).

In a typical embodiment, the Link Manager would be an ActiveX Server application interfacing with a SQL Server project database (both Microsoft, Redmond, Wash.) or other COM- or CORBA-based server.

In a typical embodiment, the Indexer would be a version of the Link Manager. For end users with a CAD application, a CADLink component [130], a version of the Indexer compatible with the specific CAD application would be included on the same computer where the CAD application resides. In a typical embodiment, building product manufacturers and trade associations [403] would use a version of the Indexer to add item names and criteria sets to product information files [110] and for transmission to the Virtual Product Library [115].

Figure 3:
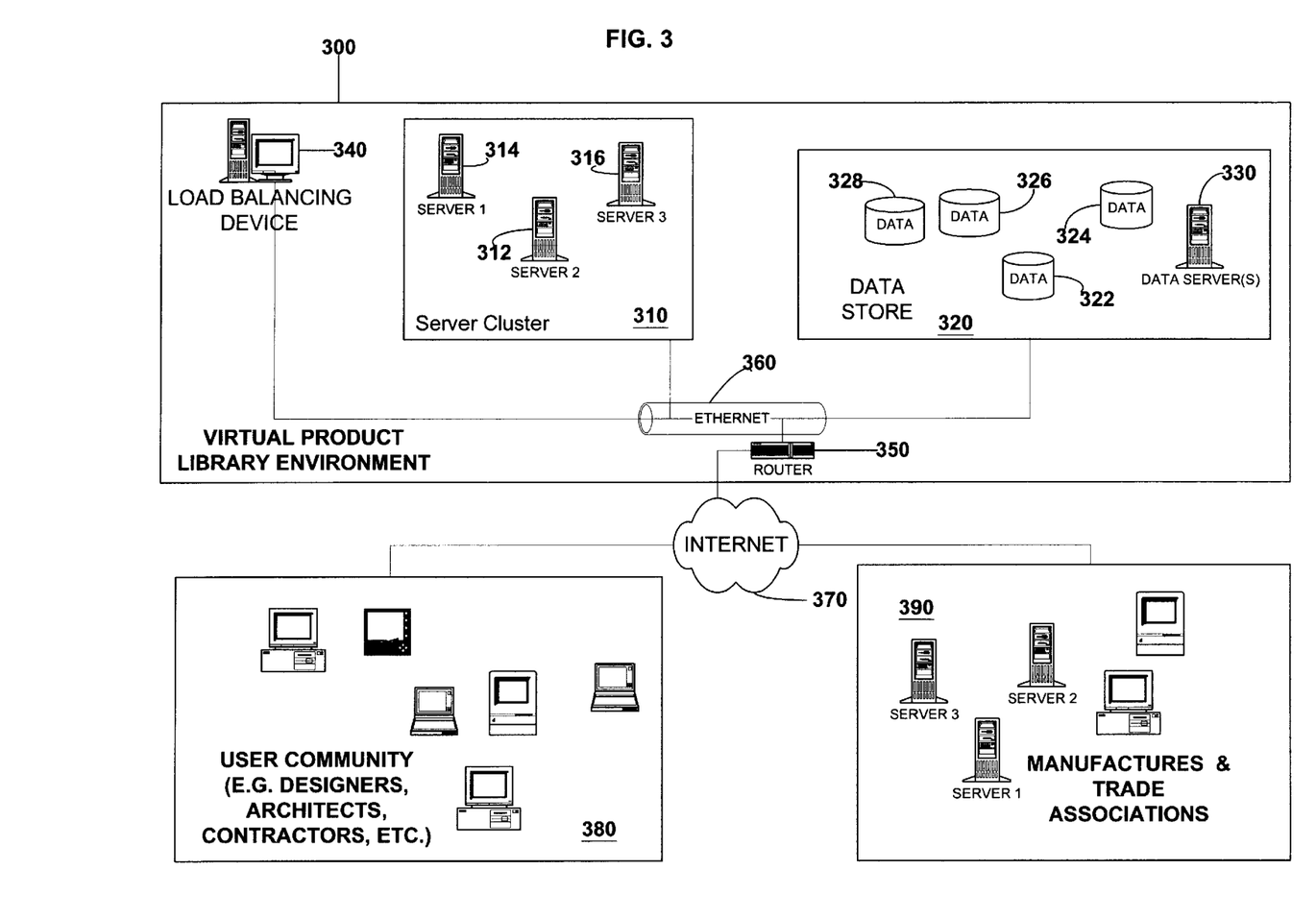
FIG. 3 is a diagram of a typical virtual product library environment according to the present invention.

FIG. 3 depicts a typical hardware/software environment for use according to the present invention. A virtual product library environment is maintained by a centralized organization; this centralized organization in some instances may be the same organization responsible for maintaining the integrity of the taxonomy.

A typical environment according to the present invention includes a virtual product library environment 300 that may include a server cluster 310 of one or more servers (e.g. 312, 314, 316) that provide virtual library functionality. These or other servers may support access by users performing specification, selection or procurement 380 and by manufacturers 390 publishing, accessing or editing (including deleting) product information. Access to the environment by these various users may be via any suitable communication channel, which in a typical embodiment will be a computer network such as the Internet 370. In other environments, access may be via other form of computer network, direct dial-up connection, dedicated connection, or other suitable channel as would be known to those skilled in the art. In some embodiments the access channel may provide security features; for instance, a secure socket layer (SSL) may be used with respect to an embodiment using the Internet as the access communication channel. The one or more servers may include or connect to a data store 320 for storing information about products and/or the various uses of the environment.

The various components of the environment may communicate with each other through any suitable communication architecture including, but not limited to, a computer network such as a Ethernet 360, token ring network or the Internet; a direct connection such as a bus connection, parallel or serial connection, null modem connection or wireless connection utilizing an appropriate communication protocol such as BLUETOOTH; and a dial-up connection. In embodiments where a single computer may provide all functional components, the communication may occur via bus connections, inter-process communication, shared files or some combination of these methods or other commonly utilized communication mechanisms.

The architecture seen in FIG. 3 uses the Internet 370 as a communication channel allowing access to the environment by various users. The environment uses a computer network such as the depicted Ethernet 360 to allow communication among the components of the environment; a router 350 is included in the environment to manage such communication within the internal network as well as managing the interface between the internal network and the Internet 370. The functionality of the environment is spread among a server cluster 310, a data store 320 and, in some embodiments, a load balancing device 340. Where a load balancing device 340 is present, the device may be responsible for allocating and managing distribution of access among various elements within the server cluster 310 and/or the data store 320. Users 380,390 access the environment through standard Web browser software or via specialized access software such as the Indexer, VPL search engine, and aecXML viewer as previously described.

The server cluster 310 provides the virtual product library functionality of the environment. In one embodiment, the server cluster 310 may be divided into access servers and application servers where the access servers provide electronic access functionality such as by electronic mail server(s) and/or Web server(s) and the application servers provide the business functionality for supporting the virtual product library functionality including, without limitation, providing search and comparison services and integrating new and/or updated product information into the data store 320. In one embodiment, the one or more servers in the server cluster may be supported via Intel-compatible hardware platforms preferably using at least a PENTIUM III class microprocessor (Intel Corp., Santa Clara, Calif.). The hardware platform would have an appropriate operating system such as WINDOWS 2000 Server (Microsoft, Redmond, Wash.), WINDOWS/NT Server (Microsoft, Redmond, Wash.), Solaris (Sun Microsystems, Palo Alto, Calif.), or LINUX (or other UNIX variant). Depending upon the hardware/operating system platform, appropriate server software may be included to support the desired application, email and Web server functionality. In one embodiment, the Web server functionality may be provided via an Internet Information Server (Microsoft, Redmond, Wash.). The email services may be supported via an Exchange Server (Microsoft, Redmond, Wash.). Application servers in some embodiments may be iPlanet Application Servers (iplanet E-Commerce Solutions—A Sun—Netscape Alliance, Mountain View, Calif.) or Citrix MetaFrame (Citrix Systems, Inc., Ft. Lauderdale, Fla.). In one embodiment, the business application services may be provided through programmed pages on the Web server; such pages may use ActiveX, VBScript, Java Applet and/or Servelet technology to provide server side business logic and may use ActiveX or JavaScript to support client side business logic.

In another embodiment, information providers may use the Indexer to create XML data stored locally on their own web servers and exposed programmatically (rather than visually) for periodic collection using a Web Service approach such as Microsoft's forthcoming .NET technology.

In some embodiments, the server cluster 310 may support e-commerce procurement of products from the virtual product library. In some such embodiment, an application server may run business-to-business integration software to support direct interfacing with online ordering systems provided by manufacturers 390; in a particular embodiment, the business-to-business integration software is a B2Bi Solutions Suite (WebMethods, Fairfax, Va.) including applicable WIDL specifications of interfaces with particular manufacturer ordering environments.

The data store 320 provides for the storage and, potentially, the management of the data required by the environment. A typical data store will include one or more storage devices (e.g. 322, 324, 326, 328), and in some embodiments, may include one or more data servers 330. Information concerning different users and information related to various items in the library are stored in the data store 320. The architecture of the data store may vary significantly in different embodiments. In several embodiments, database(s) are used to store and manipulate the data; in some such embodiment, one or more relational database management systems, such as SQL Server (Microsoft, Redmond, Wash.), ORACLE 8i (Oracle Corp., Redwood Shores, Calif.), Ingres (Computer Associates, Islandia, N.Y.), or Adaptive Server Enterprise (Sybase Inc., Emeryville, Calif.) or other object-oriented, relational, or object-relational database management systems may be used in connection with a variety of storage devices/file servers. In other embodiments, the data store may use database systems with other architectures such as object-oriented, spatial, relational or hierarchical or may use other storage implementations such as hash tables or flat files.

Throughout this application, various publications may have been referenced. The disclosures of these publications in their entireties are hereby incorporated by reference into this application in order to more fully describe the state of the art to which this invention pertains.

The embodiments described above are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method for searching and transmitting assembly item information related to an assembly project to an end user, using an end user computer, the method comprising the steps of:

a) receiving a query from an end user computer, the query comprising:
        i) an element name corresponding to a desired item or item category for an assembly project; and
        ii) a set of criteria associated with the element name, wherein the set of criteria are selected from a taxonomy comprising a set of terms, wherein the set of terms comprises:

(1) element names representing items and item categories; and (2) criteria associated with each element name, wherein the associated criteria correspond to properties of the respective item or item categories represented by each element name, wherein a common data structure is used to store criteria for all items and item a categories in the taxonomy; and b) searching a data store for an item result set based upon the received query; and c) presenting to the end user the item result set via an item set interface.

2. The method of claim 1, wherein each criteria associated with each element name in the set of terms in the taxonomy comprises:

(a) a criteria name, (b) a criteria value, (c) a unit of measure, and (d) a method of observation.

3. The method of claim 1, and further comprising the step of updating the taxonomy.

4. The method of claim 3, wherein the step of updating the taxonomy occurs at periodic intervals.

5. The method of claim 3, wherein the step of updating the taxonomy occurs immediately prior to use of the taxonomy.

6. The method of claim 3, wherein the step of updating the taxonomy comprises the steps of establishing a communication channel with a designated taxonomy authority, transmitting a request for a taxonomy update to the designated taxonomy authority via the established communication channel and receiving the taxonomy update from the designated taxonomy authority via the established communication channel.

7. The method of claim 1, wherein the taxonomy is organized as a hierarchy wherein each element corresponds to a node in the hierarchy.

8. The method of claim 1, wherein the assembly project is a construction project and wherein each element in the taxonomy is of a type selected from the group consisting of built-elements, built-element categories, products and product categories.

9. The method of claim 8, wherein the taxonomy data is organized as a hierarchy wherein each element corresponds to a node in the hierarchy.

10. The method of claim 1, and further comprising the step of providing a criteria selection interface via the end user computer by which an end user may select the set of criteria associated with the element name corresponding to the desired item or item category for the assembly project.

11. The method of claim 10, wherein the step of providing a criteria selection interface comprises the step of generating the criteria selection interface based upon the taxonomy.

12. The method of claim 11, wherein the provided criteria selection interface is organized into a hierarchical display of selectable element names; wherein, upon selection of a selected selectable element name representing an item by the end user via the provided criteria selection interface, the provided criteria selection interface displays criteria associated with the selected selectable element name; wherein, upon selection of a selected selectable element name representing an item category by the end user via the provided criteria selection interface, the provided criteria selection interface displays criteria associated with the selected selectable element name and further selectable element names corresponding to items within the item category represented by the selected selectable element name; and wherein, upon selection of a displayed criteria, the provided criteria selection interface allows designation of a value to be associated with the selected, displayed criteria.

13. The method of claim 10, wherein the provided criteria selection interface accesses the set of criteria from a project data store associated with the assembly project.

14. The method of claim 10, wherein the step of providing the criteria selection interface comprises the step of transmitting the criteria selection interface to the end user computer via a communication channel.

15. The method of claim 14, wherein the communication channel is a channel selected from the group consisting of computer network, direct serial or parallel connection, bus connection, wireless connection and dial-up connection.

16. The method of claim 15, wherein the communication channel is the Internet.

17. The method of claim 10, wherein the step of presenting the item result set via an item set interface comprises utilizing the provided criteria selection interface as the item set interface by populating the provided criteria selection interface with the item result set.

18. The method of claim 1, wherein the step of receiving the set of criteria comprises the step of accessing a project data store associated with the assembly project.

19. The method of claim 1, and further comprising the steps of establishing a communication channel with a project data store associated with the assembly project and transmitting via the established communication channel a query requesting the set of criteria.

20. The method of claim 19, wherein the established communication channel is a channel selected from the group consisting of computer network, direct serial or parallel connection, bus connection, wireless connection and dial-up connection.

21. The method of claim 20, wherein the established communication channel is the Internet.

22. The method of claim 1, wherein the step of searching the data store comprises establishing a communication channel with the data store, formatting the received set of criteria as a query, submitting the query to the data store via the established communication channel and receiving the item result set from the data store.

23. The method of claim 1, wherein the step of searching the data store comprises performing a nearest match search of the data store based upon the received set of criteria.

24. The method of claim 1, and further comprising the step of formatting the item result set into the item set interface for presentation to the end user.

25. The method of claim 24, wherein the item result set is formatted using a format selected from the group consisting of HTML, XML, aecXML and SGML.

26. The method of claim 24, wherein the step of formatting the item result set into the item set interface comprises formatting the item result set into a tabular arrangement suitable for side-by-side comparison among items in the item result set.

27. The method of claim 1, wherein the step of presenting the item result set comprises the steps of establishing a communication channel with the end user computer and transmitting the item set interface to the end user computer via the established communication channel.

28. The method of claim 1, wherein the item set interface comprises a link correlated to a specific item in the item result set that upon activation by the end user triggers presentation of additional information related to the specific item from an information source associated with the specific item.

29. The method of claim 1, wherein the item set interface provides the end user with an opportunity to select and purchase a specific item in the item result set.

30. The method of claim 1, wherein the item set interface provides the end user with an opportunity to save the item result set to a taxonomy compliant data store.

31. A system for searching and transmitting assembly item information related to an assembly project to an end user, using an end user computer, the system comprising:
   a) a data store for storing a taxonomy comprising a set of terms, wherein the set of terms comprises:
      (1) element names representing items and item categories; and
      (2) criteria associated with each element name, wherein the associated criteria correspond to properties of the respective item or item categories represented by each element name,
         wherein a common data structure is used to store criteria for all items and item categories in the taxonomy; and
   b) a processor in communication with the data store, wherein the processor:
      i) receives a query from an end user computer, the query comprising:
         (1) an element name corresponding to a desired item or item category for an assembly project; and
         (2) a set of criteria associated with the element name, wherein the set of criteria are selected from a taxonomy comprising a set of terms, wherein the set of terms comprises:
            (a) element names representing items and item categories; and
            (b) criteria associated with each element name, wherein the associated criteria correspond to properties of the respective item or item categories represented by each element name, wherein a common data structure is used to store criteria for all items and item categories in the taxonomy; and;
      ii) searches the data store for an item result set based upon the received set of criteria; and
      iii) presents to the end user the item result set via an item set interface.

32. The system of claim 31, wherein each criteria associated with each element name in the set of terms in the taxonomy comprises:
   (a) a criteria name,
   (b) a criteria value,
   (c) a unit of measure, and
   (d) a method of observation.

33. The system of claim 31, wherein the data store organization is selected from the group consisting of a database, a flat file and a hash table.

34. The system of claim 33, wherein the data store is a relational database.

35. The system of claim 33, wherein the data store comprises flat files formatted in a format selected from the group consisting of HTML, SGML, XML, and aecXML.

36. The system of claim 31, wherein the data store is segregated into a taxonomy data store and an item index data store.

37. The system of claim 36, wherein the data store is logically segregated into the taxonomy data store and the item index data store.

38. The system of claim 36, wherein the data store is physically segregated into the taxonomy data store and the item index data store.

39. The system of claim 31, wherein the end user computer comprises the processor.

40. The system of claim 39, wherein the end user computer further comprises the data store.

41. The system of claim 31, wherein the processor is in communication with the end user computer.

42. The system of claim 31, wherein the processor updates the taxonomy in the data store.

43. The system of claim 42, wherein the processor updates the taxonomy by establishing a communication channel with a designated taxonomy authority, transmitting a request for a taxonomy update to the designated taxonomy authority via the established communication channel, receiving the taxonomy update from the designated taxonomy authority via the established communication channel, and storing the received taxonomy update in the data store.

44. The system of claim 31, wherein the assembly project is a construction project and wherein each element in the taxonomy is of a type selected from the group consisting of built-elements, built-element categories, products and product categories.

45. The system of claim 31, wherein the processor provides a criteria selection interface via an end user computer by which an end user may select the set of criteria associated with the desired item for the assembly project.

46. The system of claim 45, wherein the provided criteria selection interface is organized into a hierarchical display of selectable element names; wherein, upon selection of a selected selectable element name representing an item by the end user via the provided criteria selection interface, the provided criteria selection interface displays criteria associated with the selected selectable element name; wherein, upon selection of a selected selectable element name representing an item category by the end user via the provided criteria selection interface, the provided criteria selection interface displays criteria associated with the selected selectable element name and further selectable element names corresponding to items within the item category represented by the selected selectable element name; and wherein, upon selection of a displayed criteria, the provided criteria selection interface allows designation of a value to be associated with the selected, displayed criteria.

47. The system of claim 45, wherein the processor generates the criteria selection interface based upon the taxonomy.

48. The system of claim 31, wherein the processor accesses a project data store associated with the assembly project.

49. The system of claim 31, wherein the processor searches the data store by performing a nearest match search of the data store based upon the received set of criteria.

50. The system of claim 31, wherein the processor presents the item result set by establishing a communication channel with the end user computer and transmitting the item set interface to the end user computer via the established communication channel.

51. A computer readable storage media storing instructions that, upon execution by a computer, cause the computer to search and transmit assembly item information related to an assembly project to an-end user using an end user computer by performing the steps of:
   a) providing a criteria selection interface via an end user computer by which an end user may select a set of criteria associated with a desired item for an assembly project;
   b) receiving a query from the provided criteria selection interface, the query comprising:

i) an element name corresponding to a desired item or item category for an assembly project; and
ii) a set of criteria associated with the element name, wherein the set of criteria are selected from a taxonomy comprising a set of terms, wherein the set of terms comprises:
   (1) element names representing items and item categories; and
   (2) criteria associated with each element name, wherein the associated criteria correspond to properties of the respective item or item categories represented by each element name,
   wherein a common data structure is used to store criteria for all items and item categories in the taxonomy; and
c) searching a data store for an item result set based upon the received set of criteria;
d) formatting the item result set for transmission to the end user computer; and
e) presenting the item result set to the end user via the provided criteria selection interface.

* * * * *